United States Patent
Matsushita et al.

(10) Patent No.: US 7,085,060 B2
(45) Date of Patent: Aug. 1, 2006

(54) OPTICAL COMPONENT FOR LIQUID CRYSTAL DISPLAY

(75) Inventors: Motohiko Matsushita, Nara (JP); Akihiro Funamoto, Nara (JP); Shigeru Aoyama, Soraku-gun (JP); Yuki Matsui, Nara (JP); Kenji Kawato, Hirakata (JP)

(73) Assignee: Omron Corporation, Kyoto (JP)

( * ) Notice: Subject to any disclaimer, the term of this patent is extended or adjusted under 35 U.S.C. 154(b) by 24 days.

(21) Appl. No.: 10/676,855

(22) Filed: Sep. 29, 2003

(65) Prior Publication Data

US 2004/0105157 A1 Jun. 3, 2004

(30) Foreign Application Priority Data

Sep. 30, 2002 (JP) ............................. 2002-287419

(51) Int. Cl.
*G02B 5/02* (2006.01)
(52) U.S. Cl. .................. 359/599; 359/619; 349/64; 349/112
(58) Field of Classification Search ............... 359/599, 359/584, 619, 620, 625, 626, 627, 628, 831, 359/837; 349/62, 64, 65, 67, 61, 112, 113
See application file for complete search history.

(56) References Cited

U.S. PATENT DOCUMENTS

| | | | | |
|---|---|---|---|---|
| 5,818,555 A * | 10/1998 | Yokoyama et al. | ............ | 349/67 |
| 5,861,990 A * | 1/1999 | Tedesco | ...................... | 359/599 |
| 6,222,689 B1 * | 4/2001 | Higuchi et al. | ............. | 359/837 |
| 6,611,303 B1 * | 8/2003 | Lee et al. | ...................... | 349/65 |
| 6,752,505 B1 * | 6/2004 | Parker et al. | .................. | 362/31 |
| 2002/0141065 A1 * | 10/2002 | Cowan et al. | .............. | 359/599 |

FOREIGN PATENT DOCUMENTS

WO    WO 200041009 A1 * 7/2000

\* cited by examiner

*Primary Examiner*—Arnel C. Lavarias
(74) *Attorney, Agent, or Firm*—Osha Liang LLP

(57) ABSTRACT

Plural diffusion patterns are formed on a light-incident surface of an optical film, while plural prisms are formed on a light-emitting surface. The diffusion patterns have, in at least one section thereof, a main inclined surface that is curved face with a relatively small inclination and an auxiliary inclined surface that is oppositely inclined to the main inclined surface with a relatively large inclination.

12 Claims, 18 Drawing Sheets

Ultraviolet Ray

OPTICAL COMPONENT FOR LIQUID CRYSTAL DISPLAY

BACKGROUND OF THE INVENTION

1. Field of the Invention

The present invention relates to an optical film, diffusion sheet, reflector, surface light source device and liquid crystal display. More particularly, it relates to an optical film or the like having an optical pattern formed thereon. Further, it relates to a surface light source device or liquid crystal display utilizing the optical film or the like.

2. Description of the Prior Art

FIG. 1 is an exploded and partially cutaway perspective view showing a configuration of a conventional surface light source device 1 used for a liquid crystal display or the like. In this surface light source device 1, a diffusion sheet 3 is laminated above a light guide plate 2 (an observer side) made of a transparent material having a great refractive index, on which two prism sheets 4 and 5 are laminated. Arranged below the bottom surface of the light guide plate 2 is a reflection sheet 6 made of a white sheet or the like. Further, a light source 7 composed of a cold-cathode tube is arranged at the side of the light guide plate 2.

A dot pattern 8 of diffused reflective ink as shown in FIG. 2 is printed on the bottom surface of the light guide plate 2 or a diffusion pattern by an optical pattern is recessedly provided thereon. Further, each of the above-mentioned prism sheets 4 and 5 has arranged on its top surface a prism having a triangular-shaped section that is uniformly extended. The prism sheet 5 is positioned on the prism sheet 4 so as to be rotated at an angle of 90° with respect to the prism sheet 5.

In this surface light source device 1, light emitted from the light source 7 enters into the light guide plate 2 from the side surface of the light guide plate 2, and then spreads all over the light guide plate 2 while repeating a total reflection at the top surface and the bottom surface of the light guide plate 2. As shown in FIG. 3, when light L that is transmitted as repeating the total reflection in the light guide plate 2 comes in contact with the dot pattern 8 to thereby be diffusedly reflected, an incident angle to the top surface of the light guide plate 2 is changed. When the light L incident to the top surface of the light guide plate 2 is introduced with an incident angle smaller than a critical angle of the total reflection, it is emitted to the outside from the top surface (light-emitting surface) of the light guide plate 2. Further, since the amount of the reaching light L becomes small as it becomes far away from the light source 7, the density of the dot pattern 8 is increased as it becomes far away from the light source 7 in order that the light is emitted from the top surface of the light guide plate 2 with uniform brightness.

FIG. 4 represents a movement of the light L by the light guide plate 2 having a diffusion pattern 9 recessedly provided at its bottom surface. In such a light guide plate 2 too, the transmitted light L while repeating the total reflection in the light guide plate 2 changes its incident angle to the top surface of the light guide plate 2 when it comes into contact with the diffusion pattern 9 to thereby be reflected as shown in FIG. 4. The light L incident on the top surface of the light guide plate 2 with an incident angle smaller than the critical angle of the total reflection is emitted to the outside from the top surface (light-emitting surface) of the light guide plate 2.

FIG. 5 is a view for explaining a directional characteristic of the light in this surface light source device 1. Since the light is emitted from the top surface of the light guide plate 2 with the movement shown in FIGS. 3 and 4 in the surface light source device 1, the light emitted from the top surface of the light guide plate 2 becomes light approximately parallel to the top surface of the light guide plate 2 and having a strong directivity as represented by a directional characteristic Pa. The light having a strong directional characteristic is diffused by passing through the diffusion sheet 3, thereby becoming diffused light having a directional characteristic Pb like Lambert light. Accordingly, the use of the diffusion sheet 3 improves non-uniform brightness of the light guide plate 2. Moreover, the light emitted from the top surface of the light guide plate 2 is diffused by the diffusion sheet 3 for widening the direction of the light, with the result that it is difficult to be totally reflected at the bottom surface of the prism sheet 4, thereby increasing the light amount introduced into the prism sheet 4.

However, even if the directivity is decreased by the passage through the diffusion sheet 3, the center of the directional characteristic of this light is inclined from the direction perpendicular to the diffusion sheet 3. When the diffused light passing through the diffusion sheet 3 passes through two prism sheets 4 and 5 each having different direction, the light passing through the prism sheets 4 and 5 is aligned again so as to become light with strong directional characteristics Pc and Pd having a strong directivity in two directions (direction wherein the prism of each prism sheet 4 and 5 is arranged), as well as the light-emitting direction is aligned in the direction perpendicular to the prism sheets 4 and 5.

FIG. 6 is a view for explaining a function of each of the prism sheets 4 and 5. FIG. 6A represents the movement of the light L when the light L passing through the diffusion sheet 3 is diagonally introduced into the bottom surface of one prism sheet 4. The light L introduced into the prism sheet 4 from the bottom surface of the prism sheet 4 is refracted at the bottom surface of the prism sheet 4 and is directed upward, and further refracted upon being emitted from the slope of the prism, thereby being emitted toward the direction perpendicular to the prism sheet 4.

On the other hand, the light L vertically introduced toward the bottom surface of the prism sheet 4 from the diffusion sheet 3 is totally reflected (returningly reflected) twice at the slope of the prism and then is returned toward the diffusion sheet 3 and the light guide plate 2 as shown in FIG. 6B. The light L returned to the diffusion sheet 3 and the light guide plate 2 is reflected by the reflection sheet 6 to thereby be emitted again from the top surface of the light guide plate 2.

Therefore, a part of the light L diffused by the diffusion sheet 3 and incident on the prism sheets 4 and 5 is emitted in the direction perpendicular to the prism sheets 4 and 5, while another part of the light L is returningly reflected by the prism sheets 4 and 5 to thereby be returned to the light guide plate 2, reflected by the reflection sheet 6, and then, passes through the diffusion sheet 3 to be introduced again to the prism sheets 4 and 5. As a result, the light L passing through the diffusion sheet 3 is aligned in the direction perpendicular to the prism sheets 4 and 5 to be emitted with high efficiency.

FIGS. 7A, 7B and 7C are views each showing an angle distribution of the light L emitted from the light guide plate 2, an angle distribution of the light L passing through the diffusion sheet 3 and an angle distribution of the light L passing through the prism sheet 4. Each view represents the brightness of the light L emitted in the direction at an angle of θa, θb or θc with respect to a vertical axis N as shown in FIG. 8. According to FIG. 7A, the brightness of the light L shows a great peak in the vicinity of 60°, that is sufficiently agreed with the state in which the light L emitted from the top surface (light-emitting surface) of the light guide plate 2 is normally emitted in the direction inclined from the vertical axis N (generally about 60°±15°).

Moreover, the peak of the brightness is moved to the position of approximately 40° in FIG. 7B. As the height of the brightness peak is lowered, the brightness becomes gentle in total to thereby be almost uniform. This corresponds to the fact that, when the light L passes through the diffusion sheet 3, non-uniform brightness is improved and the direction of the optical axis also approaches to the direction of the vertical axis N.

Further, the peak of the brightness is moved to the position of approximately 30° wherein the brightness in the direction at an angle of 0° (the direction of the vertical axis N) becomes great. Accordingly, it is understood from FIG. 7C that the use of the prism sheets 4 and 5 can align the emitting direction of the light L to the direction perpendicular to the prism sheets 4 and 5.

As described above, the diffusion sheet or the prism sheet arranged at the light-emitting side of the light guide plate plays an important role for reducing non-uniform brightness of the emitting light or for increasing a frontal brightness in the surface light source device.

However, the spread of the light diffused by the diffusion sheet 3 is great in the above-mentioned surface light source device, so that the light L diffused in the direction shown in FIG. 9 is transmitted through the prism sheets 4 and 5 to thereby be emitted in the diagonal direction. Such light L is a loss, thereby entailing a problem of decreasing the frontal brightness of the surface light source device.

Further, the diffusion sheet or prism sheet separately formed is required to be laminatedly arranged on the light guide plate in the surface light source device having the above-mentioned configuration shown in FIG. 1, so that there is a limitation on decreasing a thickness of the surface light source device. Moreover, the number of the components is increased in the surface light source device, thereby entailing a problem of increasing the number of assembling or increasing cost.

SUMMARY OF THE INVENTION

The present invention is accomplished in view of the above-mentioned conventional technique, and aims to provide an optical film, diffusion sheet and reflector or the like having a diffusion pattern capable of diffusing light while reducing light that is a loss.

Another object of the present invention is to provide an optical film that can integrate a prism sheet with a diffusion pattern without reducing an improvement effect of a frontal brightness by a prism sheet.

Still another object of the present invention is to provide an optical film that can integrate a reflector with a diffusion pattern without reducing an improvement effect of a frontal brightness by a prism sheet, thereby reducing the number of components.

An optical film according to the present invention is, in some preferred embodiment, an optical film wherein plural diffusion patterns are formed on a light-incident surface and plural prisms are formed on a light-emitting surface, wherein the diffusion patterns have, in at least one section, a first inclined surface made of a curved surface having a relatively small inclination and a second inclined surface that is oppositely inclined to the first inclined surface with a relatively great inclination.

A diffusion sheet according to the present invention is, in some preferred embodiment, a diffusion sheet having plural diffusion patterns formed thereon, wherein the diffusion patterns have, in at least one section, a first inclined surface made of a curved surface having a relatively small inclination and a second inclined surface that is oppositely inclined to the first inclined surface with a relatively great inclination.

A reflector according to the present invention is, in some preferred embodiment, a reflector having plural diffusion patterns formed on a light-reflecting surface, wherein the diffusion patterns have, in at least one section, a first inclined surface made of a curved surface having a relatively small inclination and a second inclined surface that is oppositely inclined to the first inclined surface with a relatively great inclination.

It is to be noted that the components explained above can optionally be combined as long as it is possible.

BRIEF DESCRIPTION OF THE DRAWINGS

FIG. 1 is an exploded and partially cutaway perspective view showing a configuration of a conventional surface light source device used for a liquid crystal display or the like.

FIG. 26 is a perspective view showing a cellular terminal of a cellular phone or the like.

DESCRIPTION OF THE PREFERRED EMBODIMENT

First Embodiment

Figure 1:
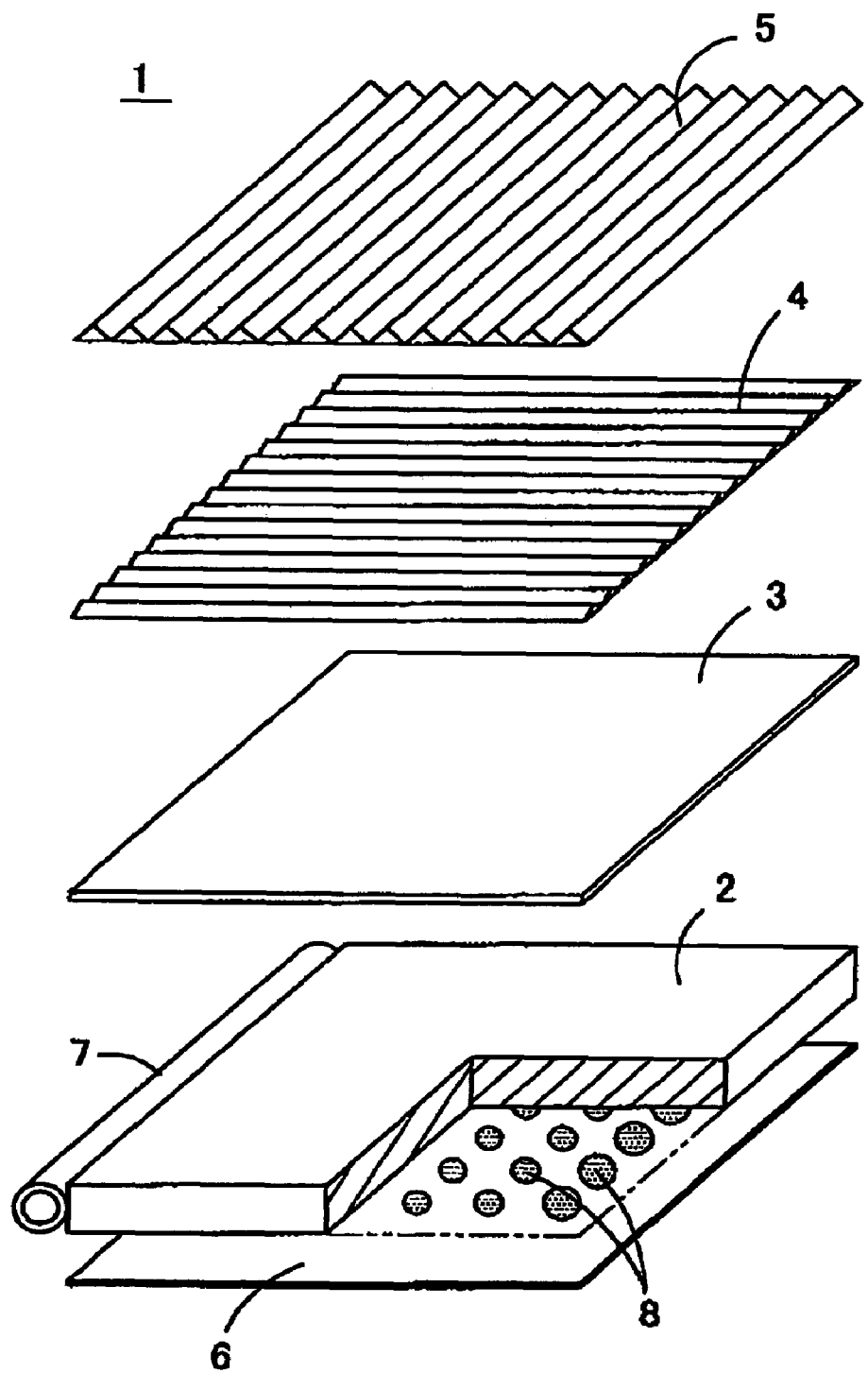
Figure 2:
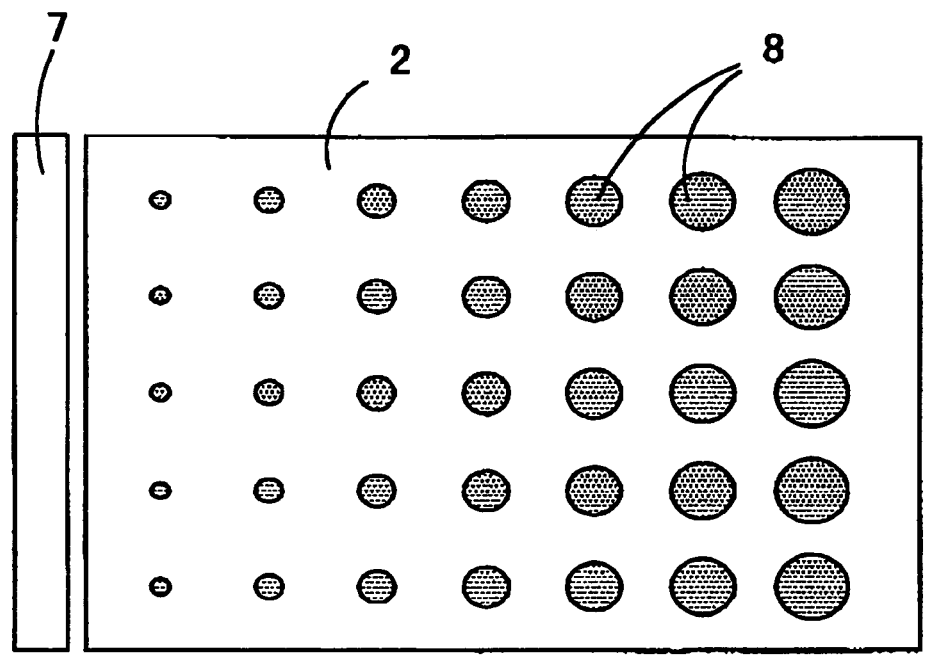
FIG. 2 is a view for explaining a dot pattern of diffused reflective ink formed on the bottom surface of a light guide plate.
Figure 3:
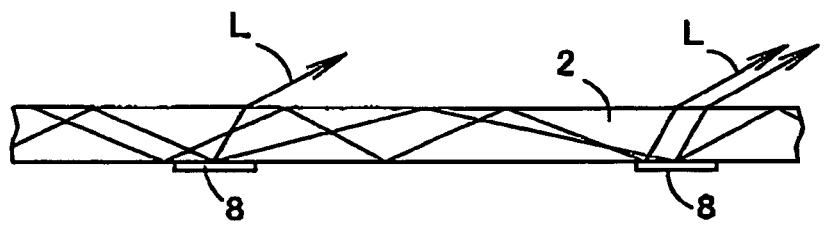
FIG. 3 is a schematic view for explaining a movement of light at the light guide plate having the dot pattern formed thereon.
Figure 4:
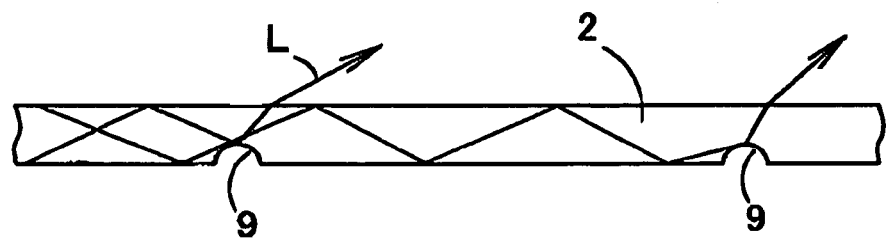
FIG. 4 is a schematic view for explaining a movement of light at the light guide plate having a diffusion pattern formed thereon.
Figure 5:
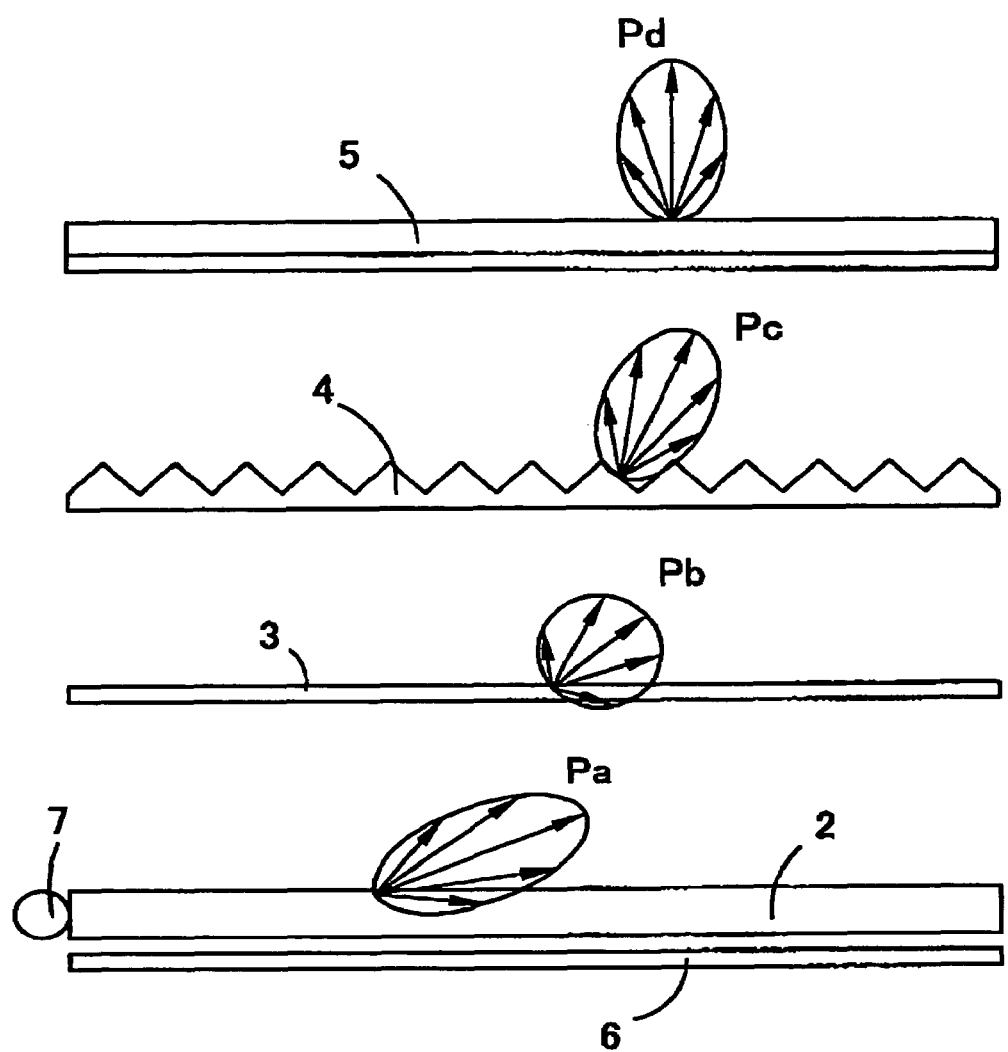
FIG. 5 is a view for explaining a directional characteristic of light in the surface light source device shown in FIG. 1.
Figure 6A:
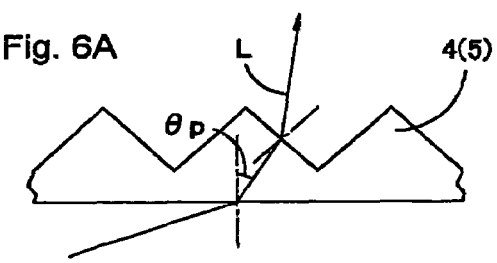
FIG. 6A and FIG. 6B are views for explaining an operation of a prism sheet in the above-mentioned surface light source device.
Figure 6B:
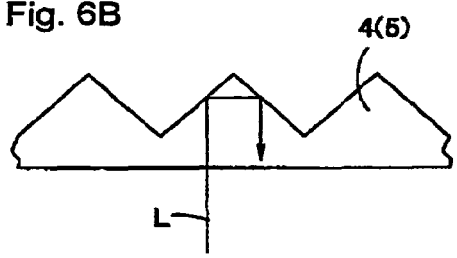
Figure 7A:
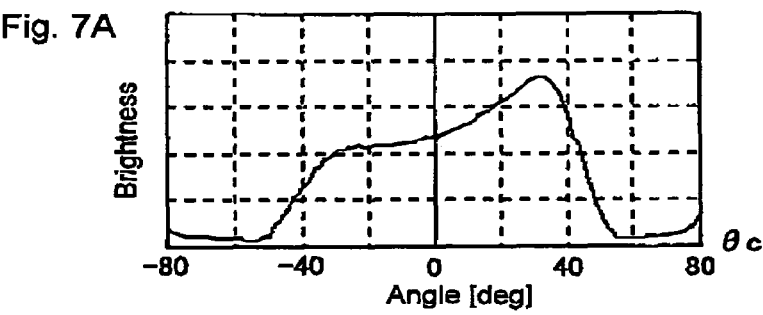
FIG. 7A is a view showing a distribution of an angle of light emitted from the light prism sheet.
Figure 7B:
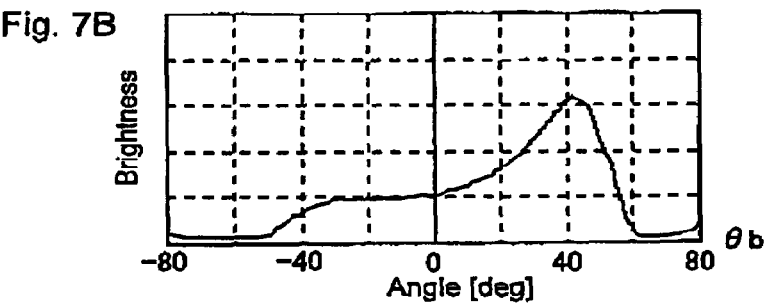
FIG. 7B is a view showing a distribution of an angle of light transmitting a diffusion sheet.
Figure 7C:
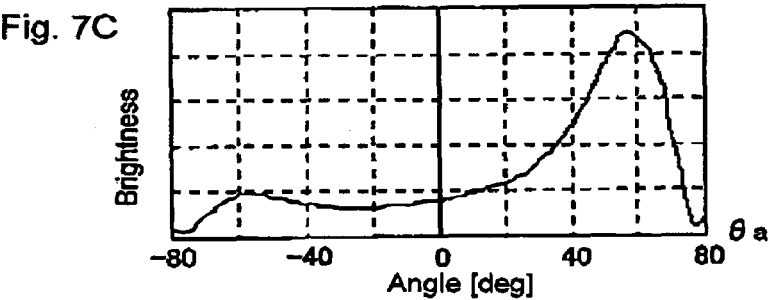
FIG. 7C is a view showing a distribution of an angle of light transmitting the light guide plate.
Figure 8:
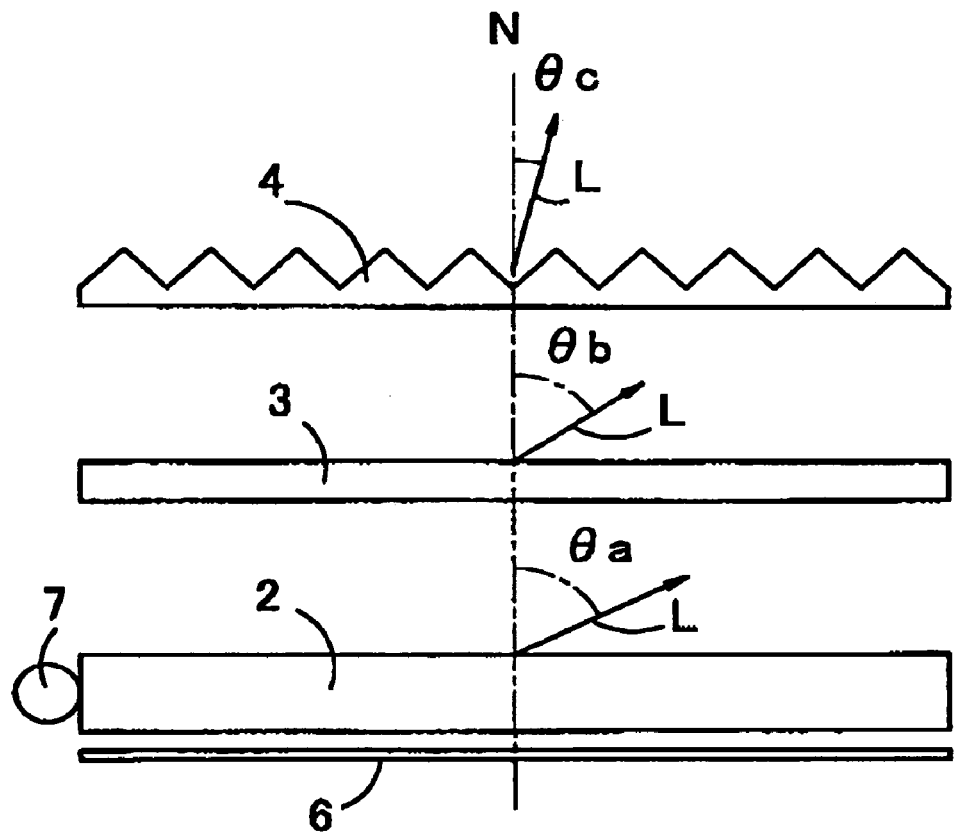
FIG. 8 is a view for explaining a definition of each angle θa, θb and θc in FIGS. 7A, 7B and 7C.
Figure 9:
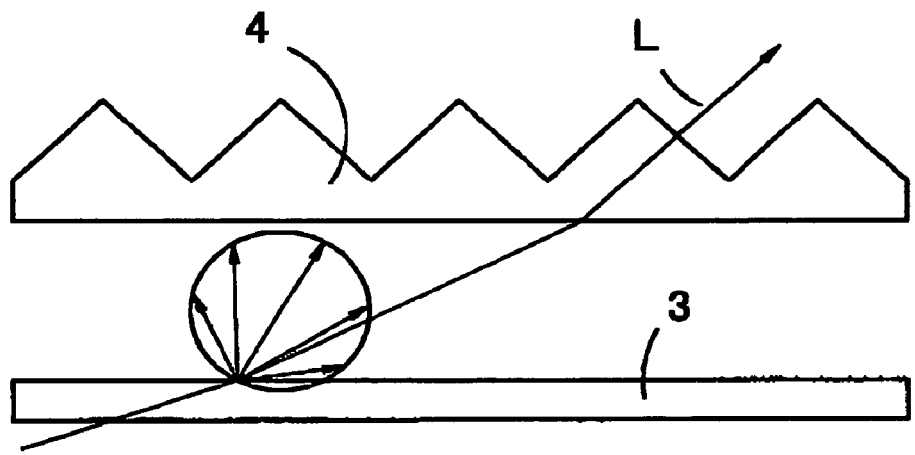
FIG. 9 is a view for explaining a problem in the conventional surface light source device.
Figure 10:
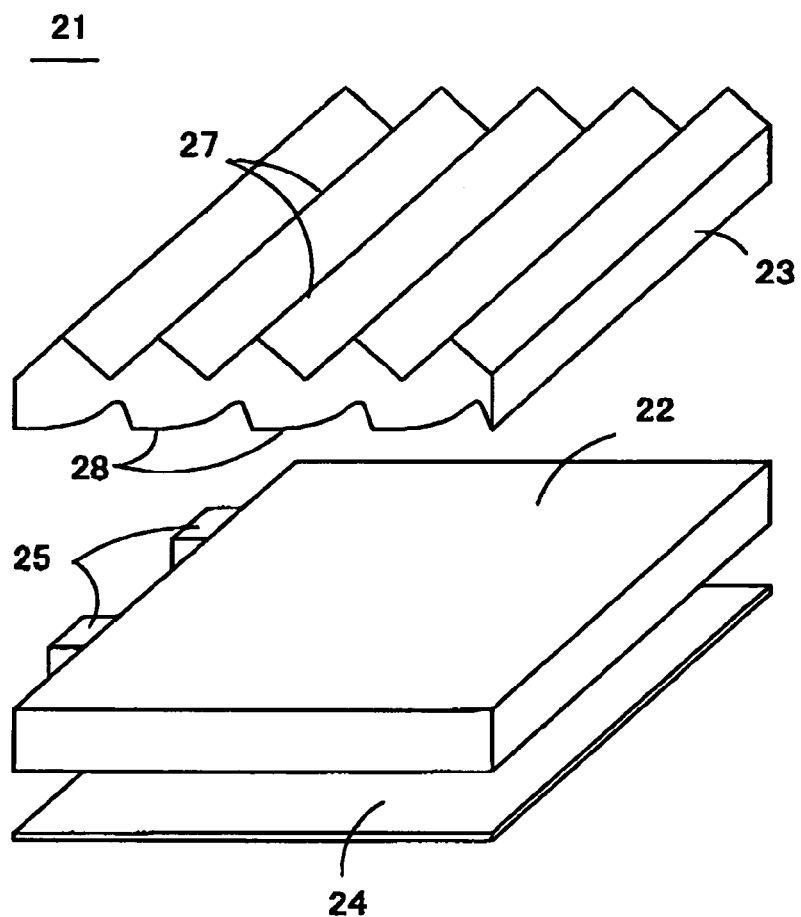
FIG. 10 is an exploded perspective view showing a surface light source device according to one embodiment of the present invention.
Figure 11:
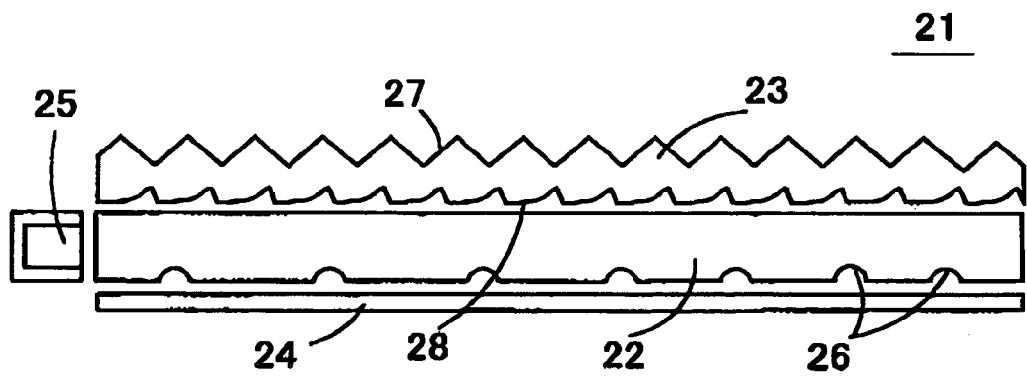
FIG. 11 is a side view of the surface light source device.

FIG. 10 is an exploded perspective view showing a surface light source device 21 according to one embodiment of the present invention. FIG. 11 is a side view thereof. This surface light source device 21 is composed of a light guide plate 22, an optical film 23 arranged on the light guide plate 22, a reflector 24 arranged below the light guide plate 22 and a light source 25 arranged so as to be opposite to the side face of the light guide plate 22. A light-emitting diode (LED), cold-cathode tube, electroluminescence (EL) or the like can be used for the light source 25. The light guide plate 22 is formed like a flat plate by a transparent resin with high refraction index such as methacrylate resin, polycarbonate resin or the like or a glass material. Formed on the bottom surface of the light guide plate 22 is a minute concave/convex pattern 26 having an arc section or triangular section, The distribution density of the concave/convex pattern 26 gradually becomes great as it is far away from the light source 25. Further, the reflector 24 is made of a white resin sheet or the like having a great surface reflectivity.

The optical film 23 is desirably made of a material having high refraction index and high light transmittance such as acrylate resin or polycarbonate resin. Besides that, preferable materials include polypropylen, polyurethane, polystyrene, polyvinyl dichloride or the like. The optical film 23 is formed to have a thickness of approximately 100 μm. Plural prisms 27 each having a triangular section (in particular, a shape of a right triangle) are arranged on its surface (light-emitting surface) in parallel with a pitch of approximately 10 to 40 μm, while plural diffusion patterns 28 are arranged in parallel on its back surface (light-incident surface). In this embodiment, each of the prisms 27 and each of the diffusion patterns 28 has a uniform sectional shape, and extends over the total width of the optical film 23. Further, the optical film 23 is arranged such that the extending direction of the diffusion patterns 28 is parallel to the side face of the light guide plate 22 opposite to the light source 25.

Figure 12:
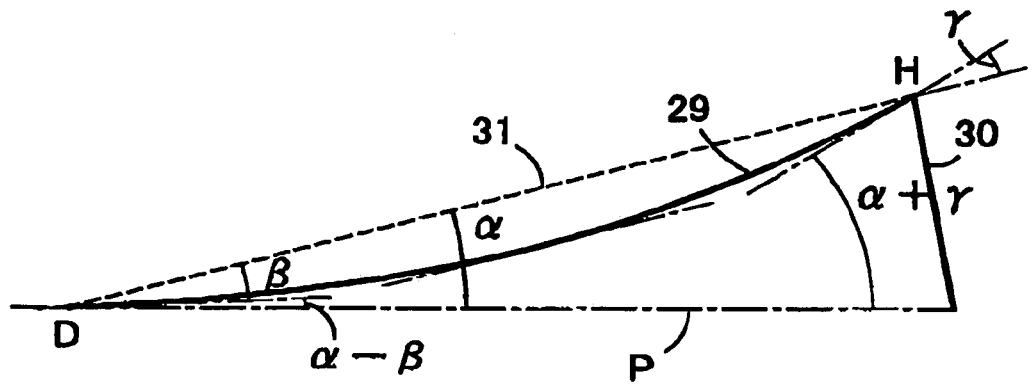
FIG. 12 is an explanatory view for showing a profile of one unit of diffusion patterns formed on the bottom surface of an optical film.

FIG. 12 is an explanatory view of a profile of one unit of the diffusion patterns 28 formed on the bottom surface of the optical film 23. The diffusion patterns 28 are formed with a pitch of approximately 10 to 40 μm. This diffusion pattern 28 has a main inclined plane 29 inclined toward the upper-right direction and auxiliary inclined plane 30 inclined toward the lower-right direction in FIG. 12. It is considered that light is emitted from the top surface of the light guide plate 22 toward the diagonally upward direction. The main inclined plane 29 has an inclination smoothly changed, so that it is a convex curved face viewed from below, while the auxiliary inclined plane 30 may be a gentle curved face or may be a flat face. When an angle made by a line segment connecting the lowermost point D to the uppermost point H of the main inclined plane 29 and a plane P (virtual) contacting to the bottom surface of the optical film 23 is defined as α, an inclination θ at each point of the main inclined plane 29 (an angle made by a tangent line contacting to the main inclined plane 29 and the plane P at each point) is changed between the minimum value and the maximum value with the angle α sandwiched therebetween. Specifically, the inclination θ at each point of the main inclined plane satisfies the following equation:

$$\theta min = \alpha - \beta \leq \theta \leq \alpha + \gamma = \theta max$$

In FIG. 12, for example, the inclination at the lowermost point D of the main inclined plane 29 is α−β, the inclination at the uppermost point H of the main inclined plane 29 is α+γ, and the inclination at the central point between the lowermost point D and the uppermost point H is gradually changed from α−β to α+γ from the lowermost point D to the uppermost point H. Assuming that the emission angle of the light emitted from the light guide plate 22 is about 60°±15°, the inclination α of the line segment linking the lowermost point D to the uppermost point H may be set to from not less than 5° to not more than 30°, and more particularly, it is desirably set to about 20°. Further, the values of β and γ are desirably set to not more than 10° respectively. Accordingly, if α=20°, the inclination of the main inclined plane 29 is changed from about 10° to about 30°. Moreover, the main inclined plane 29 is not changed with a uniform curvature from the lowermost point D toward the uppermost point H, but the curvature is gradually increased from the lowermost point D toward the uppermost point H.

Although the narrow angle between the main inclined plane 29 and the auxiliary inclined plane 30 is an acute angle at the position where the main inclined plane 29 is brought into contact with the auxiliary inclined plane 30 in FIG. 12, the angle between the main inclined plane 29 and the auxiliary inclined plane 30 is actually smoothly changed as shown in FIGS. 10 and 11 in order to obtain sufficient release characteristic upon molding the optical film 23.

Subsequently, the operation and effect of the aforesaid surface light source device 21 will be explained. The movement of light at the light guide plate 22 is the same as explained in the conventional technique, thereby omitting the explanation.

Figure 13A:
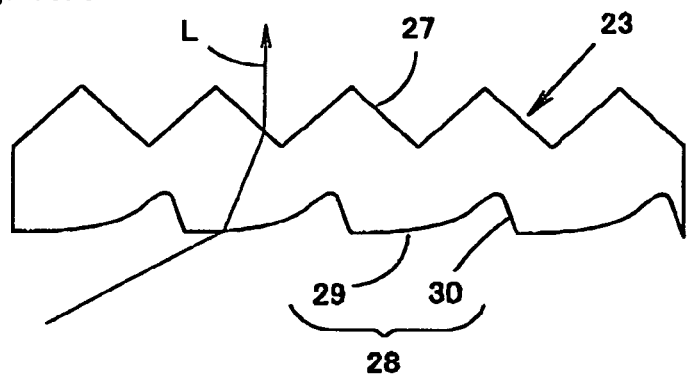
FIGS. 13A and 13B are views each for explaining a movement of light introduced into the optical film.
Figure 13B:
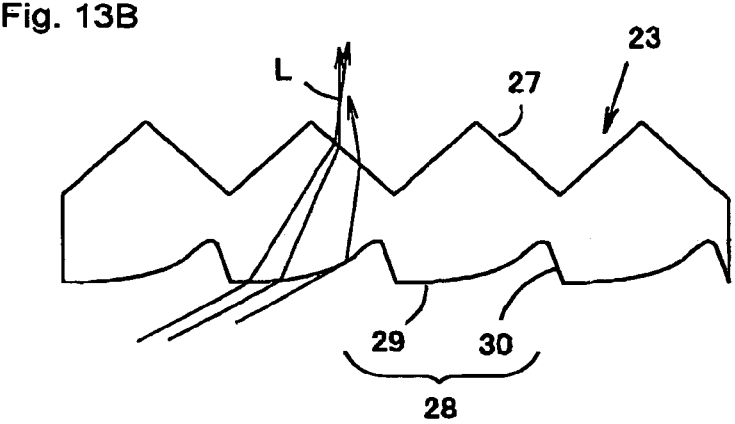

FIGS. 13A, 13B and FIGS. 14A, 14B are views for respectively explaining the movement of light incident on the optical film 23. FIGS. 13A and 13B represent the movement of the light L emitted toward the diagonally upward direction from the light-emitting surface of the light guide plate 22 and incident on the main inclined plane 29 of the diffusion pattern 28 at the bottom surface of the optical film 23. After being refracted on the inclined plane 29, the light L diagonally incident on the main inclined plane 29 is introduced to the prism 27 thereabove to be refracted thereon, thereby being emitted upwardly. Since the main inclined plane 29 is curved, the parallel light L incident on the different position of the main inclined plane 29 is refracted thereon in a little different direction, then, introduced to the prism 27 thereabove, whereupon it is refracted on the prism 27 to be upwardly emitted as shown in FIG. 13B. Accordingly, the light L diagonally incident on the main inclined plane 29 has its optical axis direction directed upward and its light beam direction changed little by little by passing through the diffusion pattern 28. Specifically, this optical film 23 has both the functions of the conventional prism sheet and the diffusion sheet.

Figure 14A:
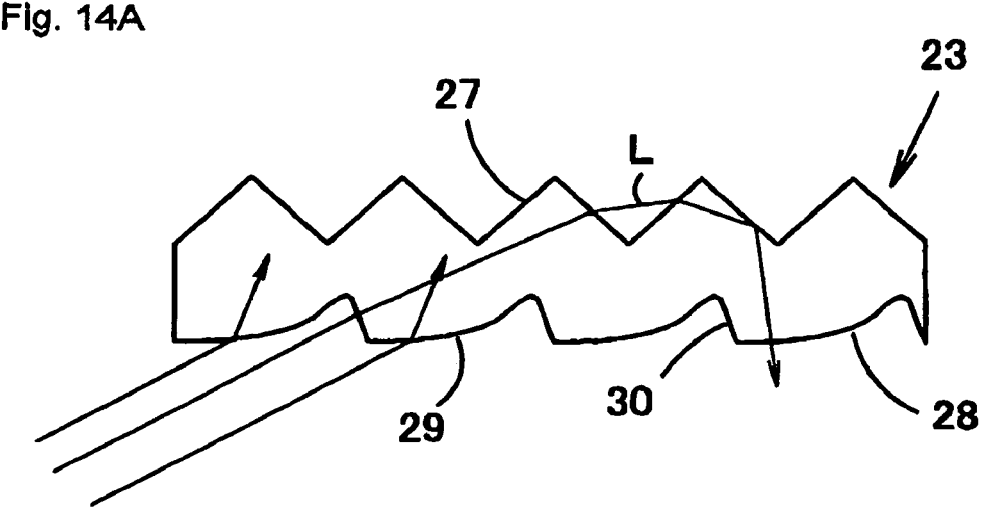
FIGS. 14A and 14B are views each for explaining a movement of light introduced into the optical film.

Moreover, FIG. 14A represents the movement of the light emitted toward the diagonally upward direction from the light-emitting surface of the light guide plate 22 and incident on the auxiliary inclined plane 30 of the diffusion pattern 28 at the bottom surface of the optical film 23. The light L incident on the auxiliary inclined plane 30 is, after transmitting the auxiliary inclined plane 30, incident on the prism 27, and then, refracted upon transmitting the prism 27 and incident again on the optical film 23 from the adjacent prism 27 as shown in FIG. 14A. Then, it is totally reflected in the prism 27, whereby the optical axis thereof is directed downward, with the result that it is emitted from the bottom surface of the optical film 23 to thereby be returned toward the light guide plate 22.

Figure 14B:
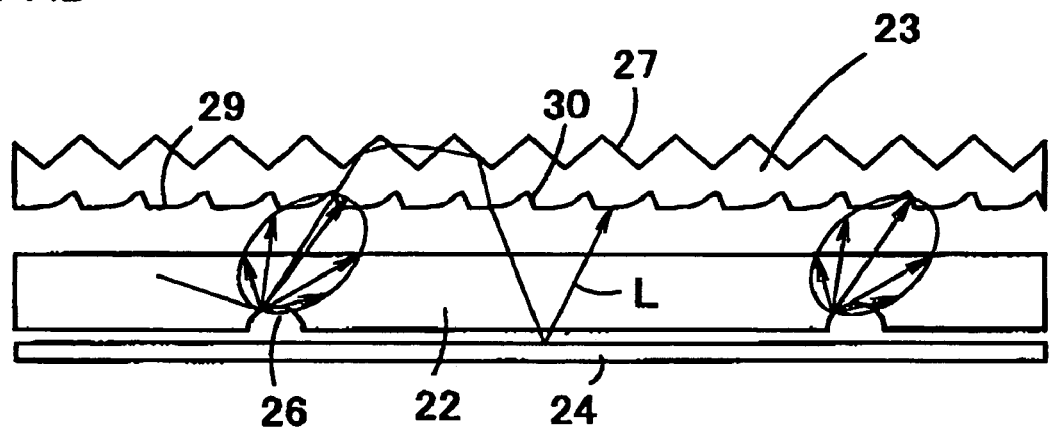

FIG. 14B is a view for explaining the operation of the auxiliary inclined plane 30. At the light guide plate 22, the light L reflected by the concave/convex pattern 26 at the bottom surface is diagonally emitted from the light-emitting surface of the light guide plate 22, the optical axis of this light L being upwardly bent by the prism 27, whereby the surface light source device 21 emits light at the section of the concave/convex pattern 26, causing a non-uniform brightness at the surface light source device 21. The conventional technique utilizes a diffusion sheet for eliminating the non-uniform brightness. On the other hand, the surface light source device 21 of the present invention eliminates the non-uniform brightness by returning the light L incident on the auxiliary inclined plane 30 to the light guide plate 22 as described above. Specifically, the light L returningly reflected to the light guide plate 22 by the diffusion pattern 28 passes through the light guide plate 22 to be regularly reflected by the reflector 24 (the reflector 24 may be the one for diffusedly reflecting the incident light), whereupon the light reflected by the reflector 24 passes through the light guide plate 22 and the optical film 23 to thereby be vertically emitted. The pitch of the prism 27 is about 10 to 40 μm and the space between the concave/convex patterns 26 is not less than 100 nm, so that the section having no concave/convex pattern 26 also becomes a light-emitting point of the light guide plate 22, thereby being capable of reducing the non-uniform brightness of the surface light source device 21. Further, although not explained here, there is the light L introduced from the main inclined plane 29 and reflected by the prism 27 to thereby be returned toward the light guide plate 22 as described later. Accordingly, the optical film 23 of the present invention can be given a function too for preventing the non-uniform brightness attained by a conventional diffusion sheet.

Moreover, the back surface of this optical film 23 has the diffusion patterns 28 thereon, that means it is not a smooth surface, whereby an interference pattern such as Newton rings does not occur between the light guide plate 22 and the optical film 23. Further, the inclination of the main inclined plane 29 is limited within a range of the angle of inclination ($\alpha-\beta \leq \theta \leq \alpha+\gamma$), so that the spread of the light passing through the main inclined plane 29 and then scattered is also restricted, whereby the directivity due to the prism 27 is difficult to be deteriorated and a problem can be eliminated wherein light is emitted in the direction far away from the vertical direction to thereby cause a loss of light.

Figure 15:
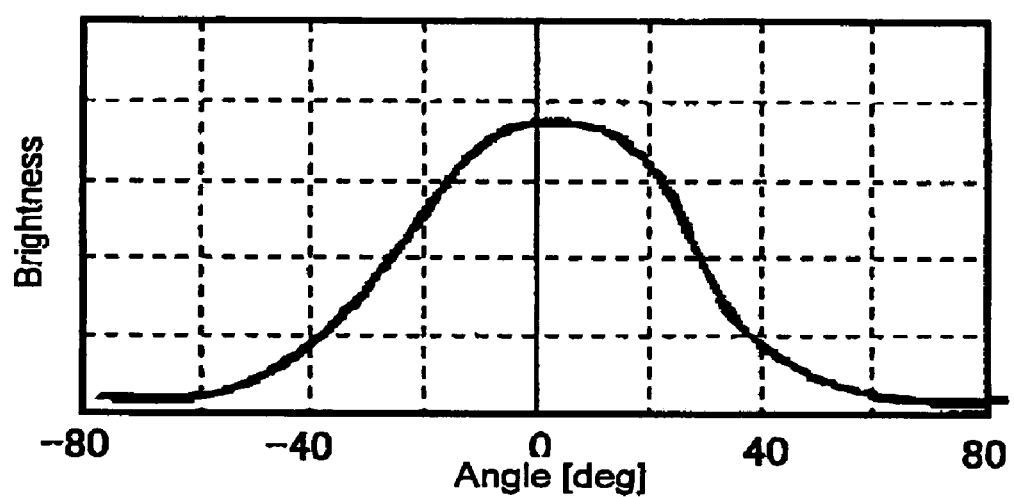
FIG. 15 is a view for showing a directional characteristic of light emitted from the surface light source device having the configuration shown in FIG. 1.

FIG. 15 is a view for showing a directional characteristic of the light emitted from the surface light source device 21 having the above-mentioned configuration. In the surface light source device 21 used for obtaining this data, the emission angle of the light emitted from the light-emitting surface of the light guide plate 22 is 60°±15° and the used optical film 23 was formed by a resin having a refractive index of 1.6. The optical film 23 had the main inclined plane 29 with the angle of inclination of $\alpha=19°$ and $\beta=\gamma 10°$ and the auxiliary inclined plane 30 with the angle of inclination of 70°. The directional characteristic obtained as the result represented a satisfactory characteristic having approximately bilateral symmetry shape as shown in FIG. 15.

Figure 16A:
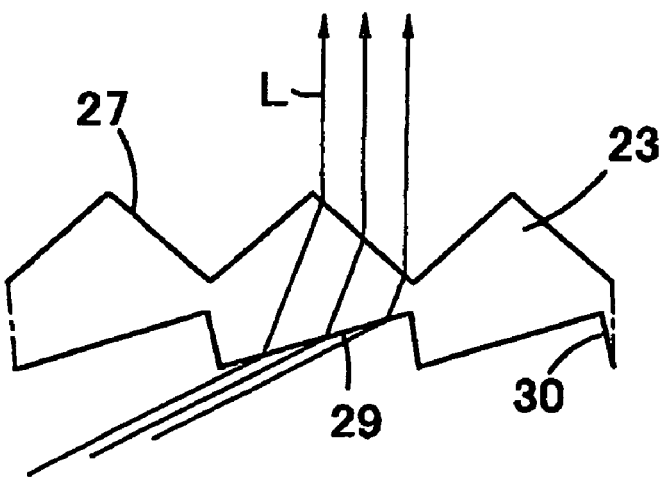
FIGS. 16A to 16C are views for explaining a design procedure of the optical film.
Figure 16B:
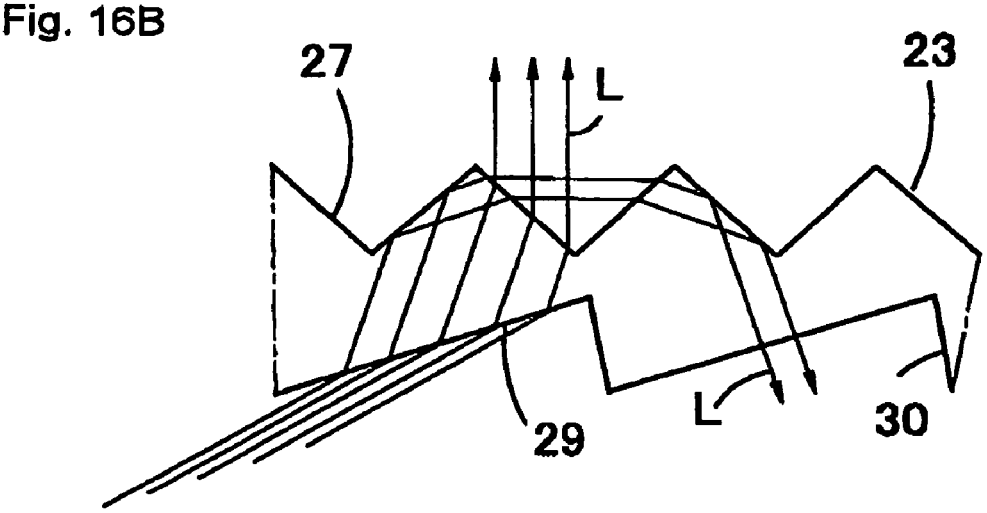
Figure 16C:
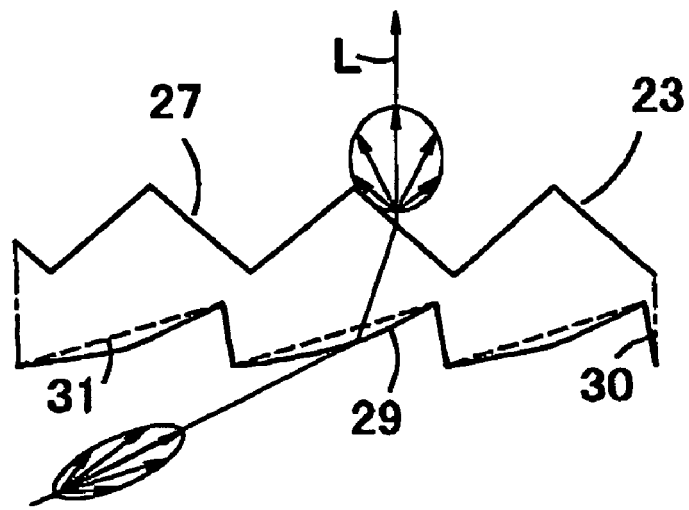

Subsequently explained is a specific design technique. FIGS. 16A to 16C are views for explaining a design process of the optical film 23. It is supposed that the refractive index of the optical film 23 is defined as 1.6 and the prism 27 thereon has a vertical angle of 90°. Further, the light introduced from the light guide plate 22 to the optical film 23 has the emission angle of 60°±15°.

Firstly, the diffusion pattern 28 composed of the flat main inclined plane 29 and the flat auxiliary inclined plane 30 is designed on the bottom surface of the optical film 23. Then, the angle θ of the main inclined plane 29 is determined such that the light incident on the diffusion pattern 28 with the incident angle of 60° is refracted on the main inclined plane 29 and the prism 27 and then emitted toward vertical upward direction as shown in FIG. 16A. This design provided the angle of inclination of the flat main inclined plane 29 of $\alpha=19°$.

A part of the light L incident on the bottom surface of the optical film 23 is emitted toward vertical upward direction as shown in FIG. 16A, but a part of the remaining light L enters into the optical film 23 from the auxiliary inclined plane 30, and then, reflected by the prism 27 to thereby be returned to the side of the light guide plate 22 as described above. Moreover, a part of the light L introduced into the optical film 23 from the main inclined plane 29 is also reflected by the prism 27, emitted from the prism 27, returned again into the optical film 23 from the adjacent prism 27, reflected by the prism 27, and then, returned to the side of the light guide plate 22 as shown in FIG. 16B. When the optical film 23 is designed so as to have the main inclined plane 29 with the angle of inclination of $\alpha=19°$ as described above, 67% of the light L incident on the back surface of the optical film 23 with an angle of 60° is emitted toward vertical upward direction, while 33% thereof is returned to the side of the light guide plate 22.

When the main inclined plane 29 is flat as shown in FIG. 16A, the light L emitted from the top surface of the optical film 23 is aligned to be parallel, but when the main inclined plane 29 is curved, the light L emitted from the top surface of the optical film 23 spreads within a predetermined range. On the other hand, the spread of the light (within the range of the emission angle) emitted from the surface of the optical film 23 has desirably a value of ±30° in general with respect to the vertical axis. Therefore, the main inclined plane 29 was curved such that, when the light L incident on the bottom surface of the optical film 23 with an angle of 60°±15° was incident from the main inclined plane 29 and then emitted from the top surface of the optical film 23, the light spread within the range of the emission angle of ±30°. Consequently, the angle of inclination of the main inclined plane 29 was changed from $\alpha-\beta=9°$ to $\alpha+\gamma=29°$. Accordingly, the design result of $\beta=\gamma=10°$ was obtained. Further, $\beta=\gamma=3°$ may be established in the case of narrowing the spread of the light emitted from the optical film 23.

Figure 17A:
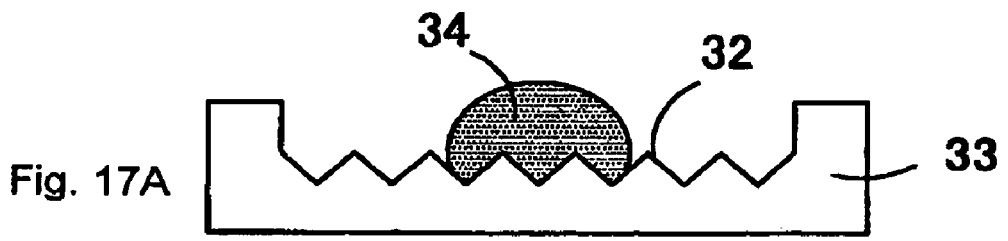
FIGS. 17A to 17E are views for explaining a fabrication process of the optical film of the present invention.
Figure 17B:
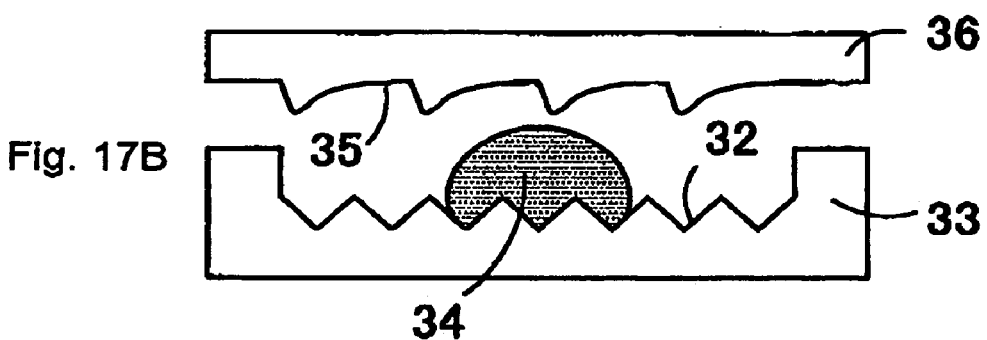
Figure 17C:
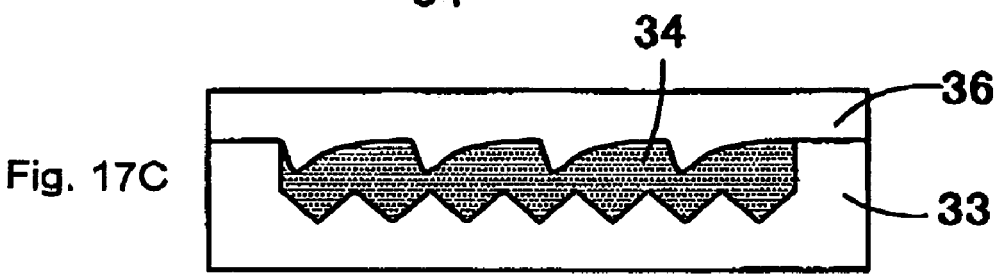
Figure 17D:
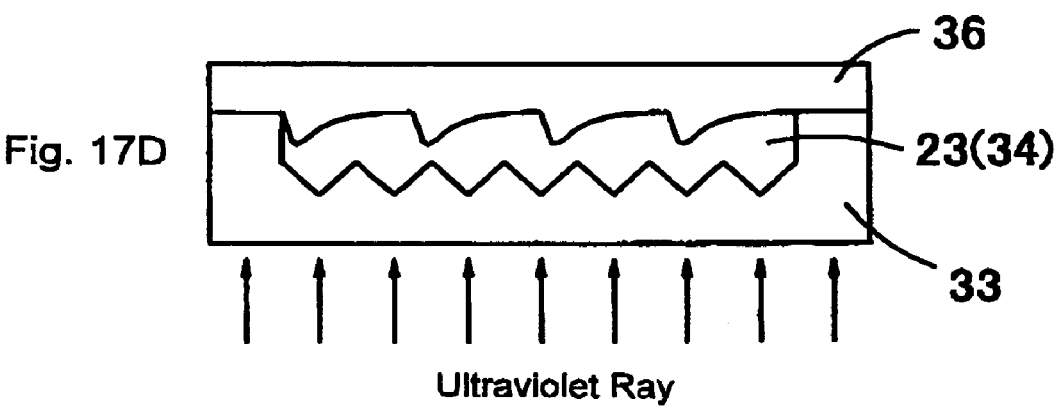
Figure 17E:
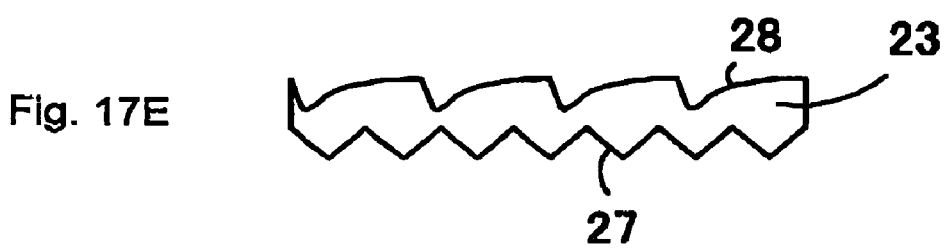

Subsequently explained is a process for fabricating the optical film 23 according to the present invention. The optical film 23 can be fabricated by a stamper method or an embossing method. FIG. 17 shows a stamper method or 2P (Photo-Polymerization) method. Firstly, a ultraviolet curing resin 34 is quantitatively dropped from a dispenser on a lower die 33 having formed thereon an inversion pattern 32 of the prism 27 with a triangular channel shape as shown in FIG. 17A. Then, as shown in FIG. 17B, the ultraviolet curing resin 34 is pressed by a stamper 36 having formed on its bottom surface an inversion pattern 35 of the diffusion pattern 28, whereupon the ultraviolet curing resin 34 is forcibly spread out in a space between the inversion pattern 35 of the stamper 36 and the inversion pattern 32 of the lower die 33 to thereby fill the ultraviolet curing rein therein as shown in FIG. 17C. Thereafter, as shown in FIG. 17D, ultraviolet ray is irradiated to the ultraviolet curing resin 34 from the bottom surface of the lower die 33 through the transparent lower die 33 to cure the ultraviolet curing resin 34, thereby forming the optical film 23. After the ultraviolet curing resin 34 is cured, the stamper 36 and the lower die 33 are opened to take out the optical film 23 shown in FIG. 17E.

Although the surface light source device 21 shown in FIGS. 10 and 11 has only the optical film 23 laminated on the light guide plate 22, a prism sheet having a smooth back surface may further be laminated on this optical film 23 in order that the direction of the prism of the optical film 23 and the direction of the prism of the prism sheet provide an angle of 90° viewed from the top.

Second Embodiment

Figure 18:
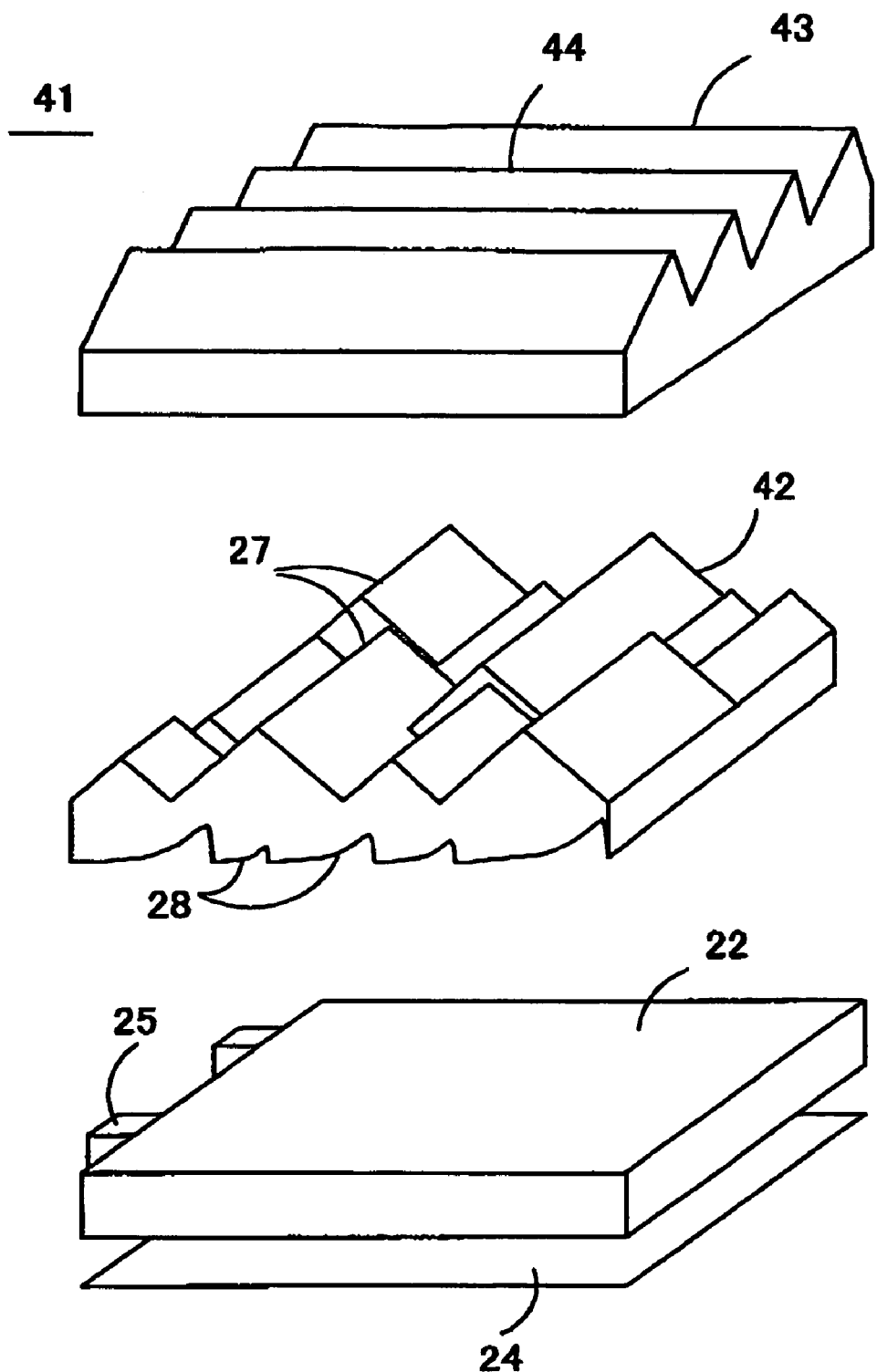
FIG. 18 is an exploded perspective view according to another embodiment of the present invention.

FIG. 18 is an exploded perspective view of a surface light source device 41 according to another embodiment of the present invention. In this surface light source device 41, an optical film 42 and a prism sheet 43 are laminated on the light guide plate 22.

Each prism 27 formed on the top surface of the optical film 42 is aligned in one direction, but does not extend all over the full width of the optical film 42 and suitably arranged sectionally on the top surface of the optical film 42. Further, the size of each prism 27 is not uniform, but formed to be a random size.

The diffusion patterns 28 formed on the bottom surface of the optical film 42 is also aligned in one direction, but each diffusion pattern 28 may be extended all over the full width of the optical film 42 or each diffusion pattern 28 may suitably provided sectionally on the bottom surface of the optical film 42. Further, each of the diffusion patterns 28 is also formed to have a random size, but they are substantially the same in shape.

The prism sheet 43 has prisms 44 with a triangular shaped section extending in one direction that are arranged in parallel to each other, the back surface of which is a smooth surface. The prism sheet 43 is arranged such that the direction of the prism 44 is perpendicular to the direction of the prism 27 of the optical film 42 viewed from the top.

In this surface light source device 41 too, the light emitted from the light guide plate 22 is scattered while being controlled within a constant range by the optical film 42 and the diffusion patterns 28, and then, emitted from the prism 27 of the optical film 42 and the prism 44 of the prism sheet 43 toward vertical upward direction. Further, non-uniform brightness caused on the light guide plate 22 is reduced by making the arrangement and size of the prism 27 random.

Third Embodiment

Figure 19:
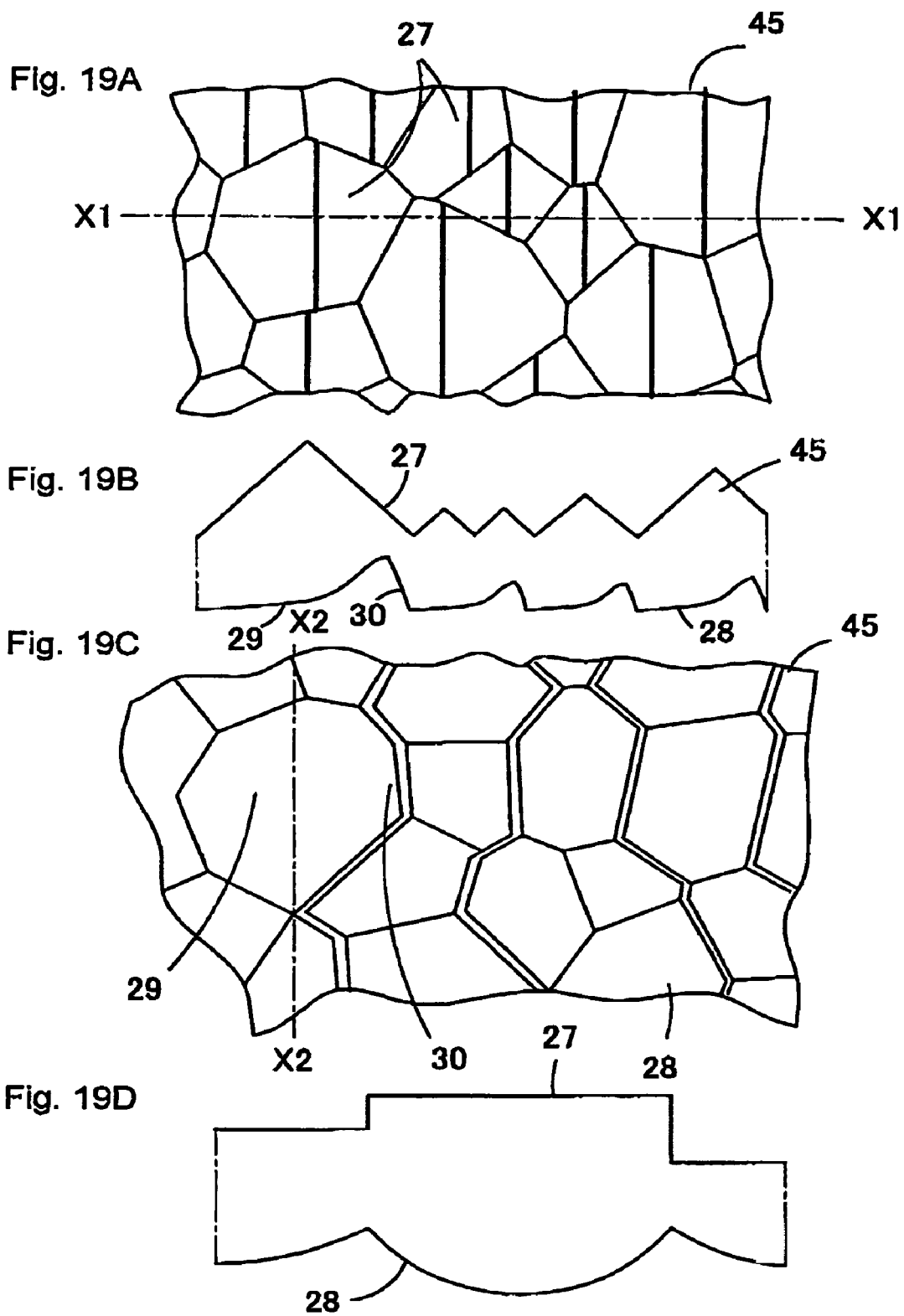
FIG. 19A is a plan view showing a part of an optical film according to a still another embodiment of the present invention.
FIG. 19B is a sectional view taken along a line X1—X1 of FIG. 19A.
FIG. 19C is a view of a back surface of the optical film shown in FIG. 19A.
FIG. 19D is a sectional view taken along a line X2—X2 of FIG. 19C.

FIG. 19A is a plan view partly showing an optical film 45 according to still another embodiment of the present invention, FIG. 19B is a sectional view taken along a line X1—X1 in FIG. 19A, FIG. 19C is a view showing the back surface thereof, and FIG. 19D is a sectional view taken along a line X2—X2 in FIG. 19C. This optical film 45 can be used for the surface light source device shown in FIG. 18. In this optical film 45, the prism 27 on the top surface is also suitably arranged sectionally, and further, the size of the prism 27 is also not uniform but formed to be random. Moreover, each prism 27 is sectioned like a tortoise shell in this optical film 45, thereby enhancing the degree of the randomness.

Further, the diffusion patterns 28 provided on the bottom surface of the optical film 45 are also sectioned in an area of a tortoise shell, so that it is arranged with a high randomness. Additionally, this optical film 45 is composed of the main inclined plane 29 and the auxiliary inclined plane 30 in the direction of X1—X1 as shown in FIG. 19B. Moreover, as shown in FIG. 19D, the surface of the diffusion pattern 28 is not flat but also curved like the embodiments explained so far in the section in the direction of X2—X2 perpendicular to the line of X1—X1. Accordingly, one diffusion pattern 28 has a curved face obtained by inclining a part of a paraboloid of revolution.

Arranging randomly the prisms 27 and the diffusion patterns 28 as described above can restrain the reduction in visibility due to the interference among the prisms 27 or among the diffusion patterns 28. Further, non-uniform brightness or occurrence of moire fringes can be restrained in case where this embodiment is applied to a surface light source device or a liquid crystal display.

Fourth Embodiment

Figure 20:
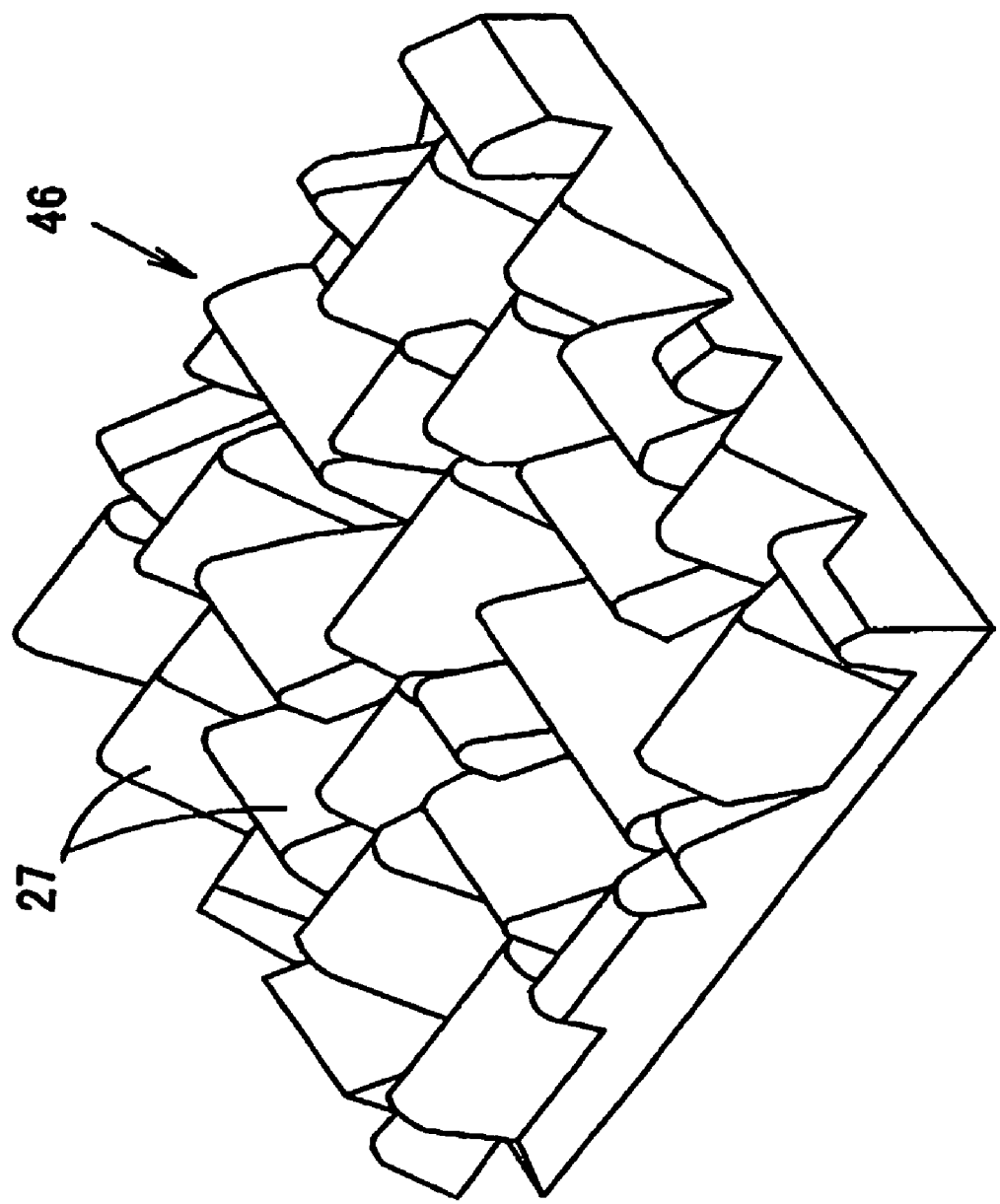
FIG. 20 is an enlarged perspective view showing a part of an optical film 46 according to a still another embodiment of the present invention.
Figure 21A:
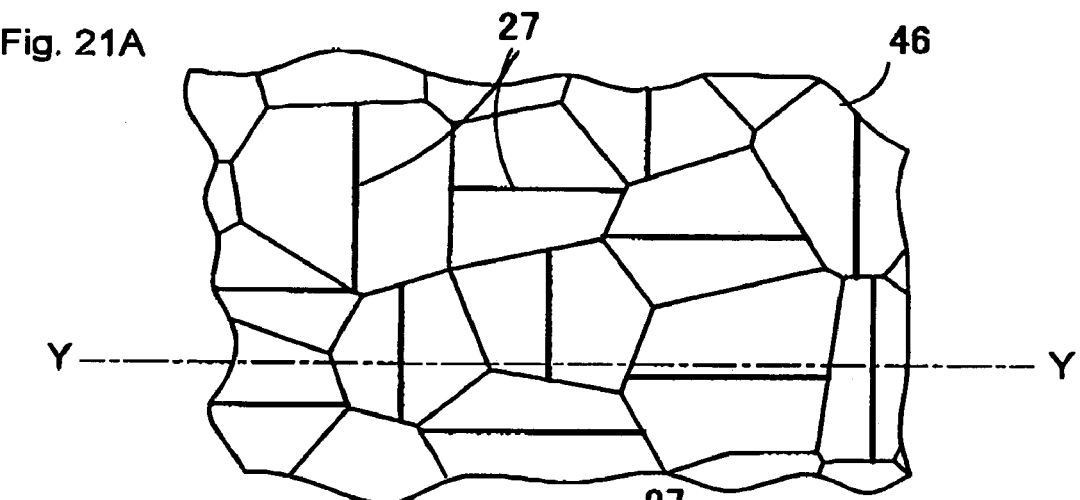
FIG. 21A is a plan view showing a part of the optical film.
Figure 21B:
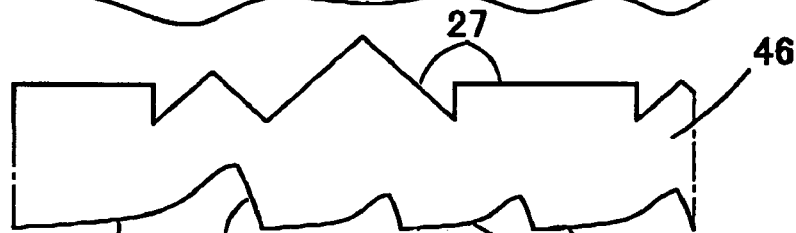
FIG. 21B is a sectional view taken along a line Y—Y of FIG. 21A.
Figure 21C:
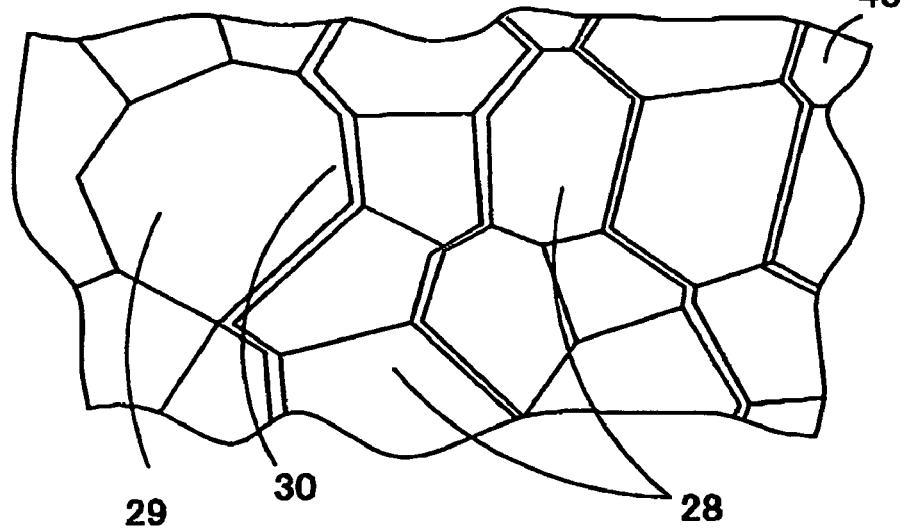
FIG. 21C is a view showing a back surface of the optical film.

FIG. 20 is an enlarged perspective view showing a part of an optical film 46 according to still another embodiment of the present invention, FIG. 21A is a plan view showing a part of the optical film 46, FIG. 21B is a sectional view taken along a line Y—Y of FIG. 21A, and FIG. 21C is a view for showing the back surface thereof. The prisms 27 in each area are aligned in the same direction in the optical film 45 shown in FIG. 19, but in this optical film 46, the direction of each prism 27 is rotated by 90° every each area. It is to be noted that the diffusion patterns 28 on the back surface are directed in the same direction.

Arranging randomly the prisms 27 and the diffusion patterns 28 as described above can restrain the reduction in visibility due to the interference among the prisms 27 or among the diffusion patterns 28. Further, non-uniform brightness or occurrence of moire fringes can be restrained in case where this embodiment is applied to a surface light source device or a liquid crystal display.

Further, in this embodiment, prisms 27 are arranged in two directions on the top surface of the optical film 46, whereby it is unnecessary to laminate two optical film and prism sheet each having prisms directed in the different direction as shown in FIG. 18, and consequently, two prism sheets can be integrated to thereby be capable of reducing the number of components.

Fifth Embodiment

Figure 22:
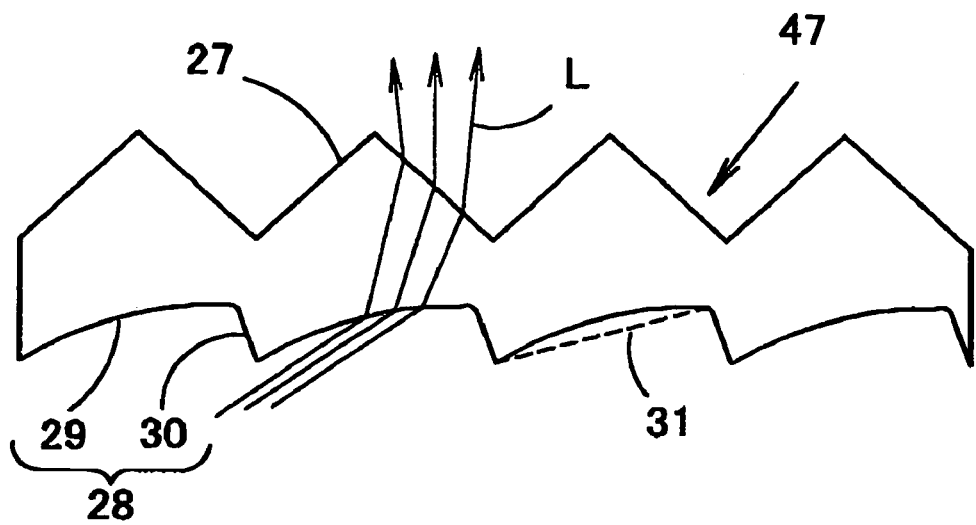
FIG. 22 is a sectional view showing an optical film according to a still another embodiment of the present invention.

FIG. 22 is a sectional view showing a part of an optical film 47 according to still another embodiment of the present invention. In the optical film 23 explained with reference to FIGS. 10 to 13, each diffusion pattern 28 has a convex curved surface viewed from the bottom surface, but it may have a concave curved surface viewed from the bottom surface. In this case, the inclination θ at each point on the section of the diffusion pattern 28 is also set to satisfy the equation of $\alpha-\beta \leq \theta \leq \alpha+\gamma$ with respect to the inclination α of the segment line 31 connecting the lowermost point D to the uppermost point H.

Sixth Embodiment

Figure 23:
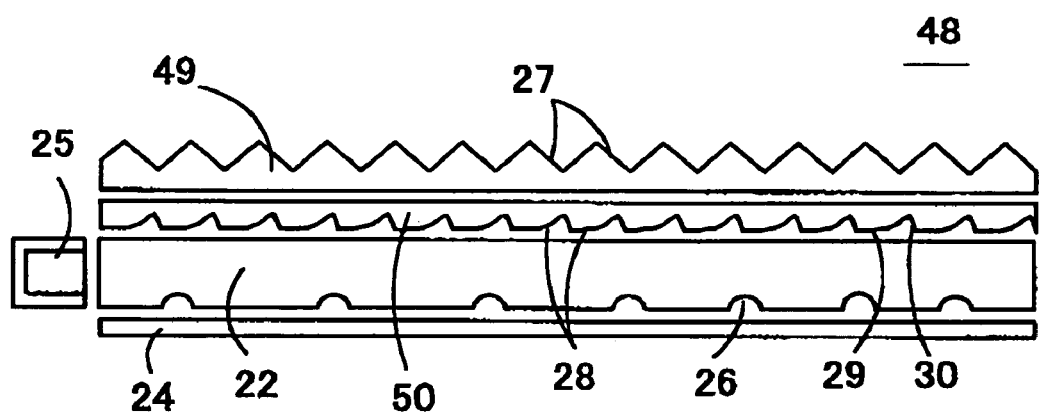
FIG. 23 is a sectional view of a surface light source device according to a still another embodiment of the present invention.

FIG. 23 is a sectional view showing a surface light source device 48 according to still another embodiment of the present invention. In this surface light source device, a diffusion sheet 50 and a prism sheet 49 are laminated on the light guide plate 22. This means that the optical film according to the present invention is separated into the side of the prisms 27 and the side of the diffusion patterns 28. Specifically, prisms 27 each having a triangular shaped section are formed all over the full width or formed sectionally on the top surface of the prism sheet 49, while the back surface of the prism sheet 49 is formed to be smooth. The diffusion patterns 28 composed of the main inclined plane 29 and the auxiliary inclined plane 30 are formed all over the full width or formed sectionally on the bottom surface of the diffusion sheet 50, while the top surface of the diffusion sheet 50 is formed to be smooth.

Separating the prism sheet 49 and the diffusion sheet 50 as described above allows to form a pattern (prisms 27, diffusion patterns 28) on only one side of each sheet, thereby facilitating the manufacture. It is to be noted that the top surface of the diffusion sheet 50 and the bottom surface of the prism sheet 49 may be bonded with an adhesive having a refractive index equal to that of the diffusion sheet 50 and that of the prism sheet 49.

Seventh Embodiment

Figure 24:
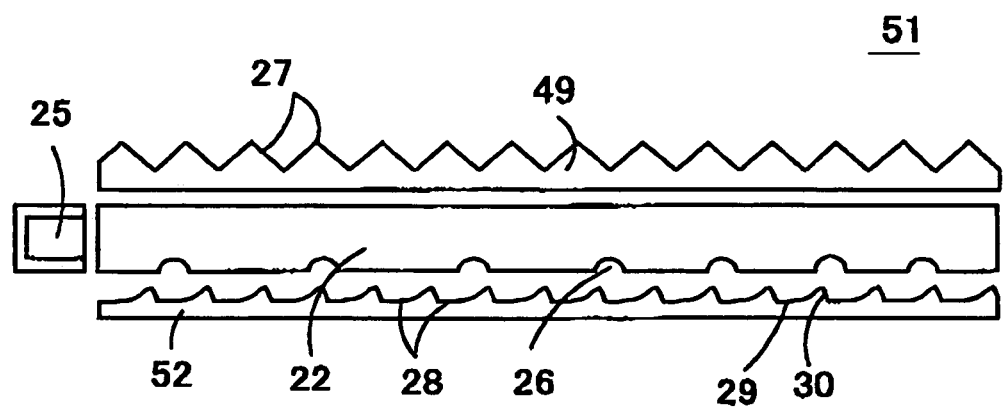
FIG. 24 is a sectional view of a surface light source device according to a still another embodiment of the present invention.

FIG. 24 is a sectional view of a surface light source device according to still another embodiment of the present invention. In this surface light source device 51, a prism sheet 49 is arranged on the light guide plate 22 and a reflector 52 is arranged below the light guide plate 22. The prisms 27 each having a triangular shaped section are formed all over the full width or sectionally formed on the top surface of the prism sheet 49, while the back surface of the prism sheet 49 is formed to be smooth. Provided on the top surface of the reflector 52 are the diffusion patterns 28 composed of the main inclined plane 29 and the auxiliary inclined plane 30 as described above.

In this surface light source device 51, the light diagonally emitted from the top surface of the light guide plate 22 is directed to the vertical upward direction by the prism sheet 49 for aiming to improve the frontal brightness of the surface light source device 51. On the other hand, light leaked from the bottom surface of the light guide plate 22 or light emitted from the top surface of the light guide plate 22 and then returningly reflected by the prism sheet 49 to transmit the light guide plate 22 is scattered by the diffusion patterns 28 while being controlled to be placed in a predetermined range upon the reflection by the reflector 52, and then, transmits the light guide plate 22 and the prism sheet 49 to thereby be vertically emitted, so that non-uniform brightness caused on the light guide plate 22 can be reduced (it is to be noted that the effect for reducing the non-uniform brightness is decreased compared to the first embodiment). Further, light scattered by the reflector 52 is scattered within a predetermined range, whereby the scattering light is difficult to be a loss.

Eighth Embodiment

Figure 25:
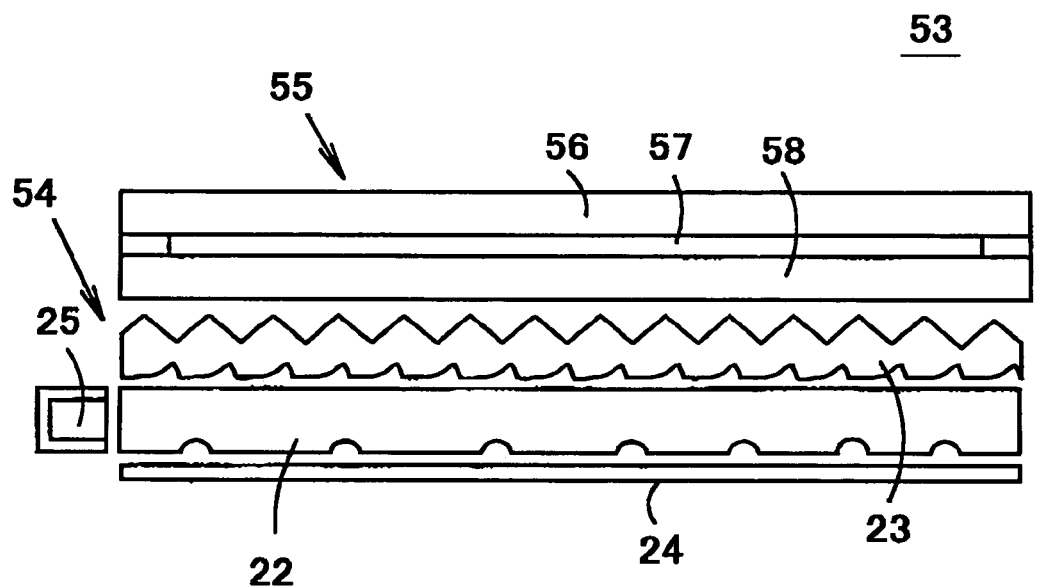
FIG. 25 is a schematic sectional view of a liquid crystal display using a surface light source device of the present invention.

FIG. 25 is a schematic sectional view of a liquid crystal display 53 using a surface light source device 54 according to the present invention. This liquid crystal display 53 has a liquid crystal display panel 55 arranged on the surface light source device 54 of the present invention. The liquid crystal display panel has a liquid crystal layer 57 sealed between an electrode substrate 58 having a TFT or the like formed thereon and an opposite substrate 56, whereby an image is produced by turning on or off each pixel. The use of the surface light source device 54 of the present invention for this liquid crystal display 53 enhances the main surface brightness, thereby being capable of obtaining a bright image and further being capable of obtaining a thin-sized liquid crystal display 53.

Ninth Embodiment

Figure 26:
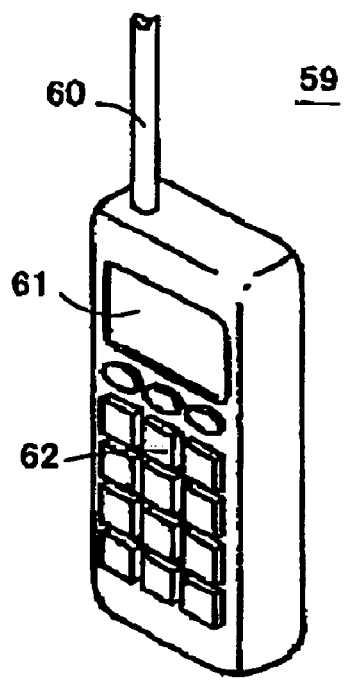
Figure 27:
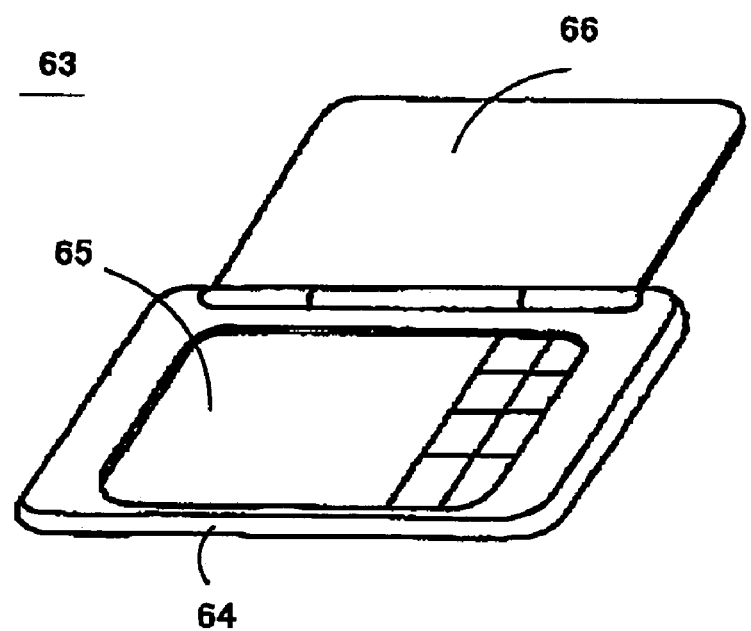
FIG. 27 is a perspective view showing a mobile computer.

FIGS. 26 and 27 are perspective views showing applications of a surface light source device and liquid crystal display according to the present invention. FIG. 26 is a perspective view showing a cellular terminal 59 of a cellular phone or the like and it has an antenna 60, a liquid crystal display section 61 and input keys 62. The use of the surface light source device or the liquid crystal display of the present invention for the liquid crystal display section 61 of this cellular terminal 59 can provide a bright image, thereby providing a satisfactory visibility, or can suppress the exhaustion of a battery by a reduced loss of light. Further, a thin-sized liquid crystal display section 61 can also attribute to obtain a thin-sized cellular terminal 59.

Moreover, FIG. 27 shows a mobile computer 63. This mobile computer 63 has a touch panel/display section 65 provided in a case 64, the touch panel/display section 65 being protected by closing a cover 66. The use of the surface light source device or the liquid crystal display of the present invention for the touch panel/display section 65 of this mobile computer 63 can provide a bright image, thereby providing a satisfactory visibility, or can suppress the exhaustion of a battery by a reduced loss of light. Further, a thin-sized touch panel/display section 65 can also attribute to obtain a thin-sized mobile computer 63.

An optical film, diffusion sheet and reflector of the present invention can diffuse light while controlling a diffusing direction by a first inclined surface, thereby suppressing a non-uniform brightness of incident light by diffusing the incident light, and further, enables to hardly scatter light in the direction that causes a loss, thereby being capable of aiming to improve a frontal brightness.

Additionally, the optical film or reflector of the present invention can reduce the number of components, that leads to provide a thin-sized surface light source device or liquid crystal display using the optical film or the reflector, thereby also being capable of obtaining an effect of reducing cost.

What is claimed is:

1. An optical film comprising:
    plural diffusion patterns formed on a light-incident surface, the light-incident surface being the bottom surface of the optical film, and
    plural prisms formed on a light-emitting surface, the light-emitting surface being the top surface of the optical film, wherein
    each of the diffusion patterns has, in at least one section thereof, a first inclined surface and a second inclined surface,
    the first inclined surface being curved and
    the second inclined surface being oppositely inclined to the first inclined surface, wherein
    incident light hitting the first inclined surface is diffused by the first inclined surface, passed through the optical film, and emitted from the prisms, and
    incident light hitting the second inclined surface is reflected by the prisms, and emitted from the bottom surface of the optical film.

2. The optical film according to claim 1, wherein an angle of inclination of the first inclined surface is gradually changed from the lowermost point to the uppermost point.

3. The optical film according to claim 1, wherein a formula of $$5° \leq \alpha \leq 30°$$

is established wherein an angle of inclination of a segment line connecting the lowermost point to the uppermost point is defined as $\alpha$.

4. The optical film according to claim 1, wherein formulae of $$\theta max - \alpha \leq 10°$$

$$\alpha - \theta min \leq 10°$$

are established wherein an angle of inclination of a segment line connecting the lowermost point to the uppermost point is defined as $\alpha$, the maximum angle of inclination of the first inclined surface is defined as $\theta max$, and the minimum angle of inclination of the first inclined surface is defined as $\theta min$.

5. The optical film according to claim 1, wherein an angle of inclination of the second inclined surface is approximately 70°.

6. The optical film according to claim 1, wherein a boundary area between the first inclined surface and the second inclined surface is formed smooth and curved.

7. The optical film according to claim 1, wherein the prisms are randomly formed in size and position.

8. The optical film according to claim 7, wherein each of the prisms is arranged such that its axial direction is directed toward two or more directions.

9. The optical film according to claim 1, wherein the diffusion patterns are randomly formed in size and random position.

10. The optical film according to claim 9, wherein each of the diffusion patterns has substantially the same shape to one another.

11. A surface light source device comprising a light source, a light guide plate that confines light from the light source for transmitting the same and emits the light from a light-emitting surface, and an optical film according to claim 1 arranged so as to face the light-emitting surface of the light guide plate.

12. A liquid crystal display comprising a light source, a light guide plate that confines light from the light source for transmitting the same and emits the light from a light-emitting surface, an optical film according to claim 1 arranged so as to face the light-emitting surface of the light guide plate, and a liquid crystal display panel.

* * * * *